United States Patent
Chidlovskii (10) Patent No.: US 9,349,150 B2
(45) Date of Patent: May 24, 2016

(54) SYSTEM AND METHOD FOR MULTI-TASK LEARNING FOR PREDICTION OF DEMAND ON A SYSTEM

(71) Applicant: Xerox Corporation, Norwalk, CT (US)

(72) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 237 days.

(21) Appl. No.: 14/140,640

(22) Filed: Dec. 26, 2013

(65) Prior Publication Data

US 2015/0186792 A1 Jul. 2, 2015

(51) Int. Cl.
*G06N 5/02* (2006.01)
*G08G 1/01* (2006.01)
*G06Q 50/28* (2012.01)
*G06Q 10/04* (2012.01)
*G06Q 50/26* (2012.01)

(52) U.S. Cl.
CPC ............... *G06Q 50/26* (2013.01); *G06N 5/025* (2013.01); *G06Q 10/04* (2013.01); *G06Q 50/28* (2013.01); *G08G 1/0129* (2013.01)

(58) Field of Classification Search
None
See application file for complete search history.

(56) References Cited

U.S. PATENT DOCUMENTS

| 7,756,341 | B2 | 7/2010 | Perronnin | |
| 8,762,048 | B2 * | 6/2014 | Kosseifi | G01C 21/3415 701/410 |
| 2012/0173474 | A1 * | 7/2012 | Chatterjee | G08G 1/0104 706/52 |

OTHER PUBLICATIONS

Hong, Application of seasonal SVR with chaotic immune algorithm in traffic flow forecasting, 2012.*
Liu et al, A Short-Term Forecasting Algorithm for Network Traffic Based on Chaos Theory and SVM, 2010.*
Lu et al, Combining independent component analysis and growing hierarchical self-organizing maps with support vector regression in product demand forecasting, 2010.*
U.S. Appl. No. 13/553,614, to Chidlovskii et al., filed Jul. 19, 2012, entitled: Traffic Delay Detection by Mining Ticket Validation Transactions.
Leiva-Murillo, Jose M. et al., *Multitask SVM Learning for Remote Sensing Data Classification*, Proc. SPIE 7830, Image and Signal Processing for Remote Sensing XVI, 78300L (Oct. 22, 2010).
Müller, K.R. et al., *Predicting Time Series with Support Vector Machines*, Proceedings of the 7th International Conference on Artificial Neural Networks, pp. 999-1004, Oct. 8-10, 1997.
Rüping, Stefan. *SVM Kernels for Time Series Analysis*, CS Dept., AI Unit, University of Dortmund, Dortmund, Germany, 2001.
Sapankevych, Nicholas I. et al., *Time Series Prediction Using Support Vector Machines: A Survey*. IEEE Computational Intelligence Magazine, May 2009, pp. 24-38.
Smola, Alex J., et al. *A Tutorial on Support Vector Regression*, Royal Holloway College, London, UK, NeuroCOLT Tech. Rep., 1998.

* cited by examiner

Primary Examiner — Stanley K Hill
Assistant Examiner — Mikayla Chubb
(74) Attorney, Agent, or Firm — Fay Sharpe LLP (57) ABSTRACT

A multi-task learning system and method for predicting travel demand on an associated transportation network are provided. Observations corresponding to the associated transportation network are collected and a set of time series corresponding to travel demand are generated. Clusters of time series are then formed and for each cluster, multi-task learning is applied to generate a prediction model. Travel demand on a selected segment of the associated transportation network corresponding to at least one of the set of time series is then predicted in accordance with the generated prediction model.

20 Claims, 10 Drawing Sheets

SYSTEM AND METHOD FOR MULTI-TASK LEARNING FOR PREDICTION OF DEMAND ON A SYSTEM

BACKGROUND

The subject disclosure is directed to transportation arts, the data processing arts, the data analysis arts, the tracking arts, the predictive arts, and the like.

Intelligent transportation systems generally include multiple vehicles, routes, and services that are utilized by a large number of users. Efficient planning and management of transportation networks, in particular, e.g., an adequate response to changing traffic conditions, require an accurate modeling and real-time prediction of these time-dependent entities. The ability to track and analyze various time-dependent events, such as vehicle position, road load, travel time and demand, traffic density, etc., represent some of the factors that must be taken into consideration during transportation planning and management. Accordingly, efficient planning of transport services requires an accurate estimation of the number of travelers entering the network at any period of time, commonly referenced as the travel demand on a public transportation network.

Currently, prediction of travel demand requires the collection of information relative to a variety of segments of the transportation network, each segment referring to a particular route, a vehicle, a stop, a series of stops, etc. Each must individually be modeled to properly predict a demand on that segment, and aggregation is then performed for the overall demand on a system. That is, each individual segment requires substantial computation and analysis for effective and efficient management. Additionally, the amount of data available for disparate segments may be different.

Any entity that changes over time may be represented as a time series, and travel demand on a transportation system does vary over time. One problem often encountered in planning and management of transportation networks is the modeling and prediction of a series of temporal events. For example, the number of passengers on a particular vehicle may vary over the course of a day, the number of travelers on the network may vary over the course of a week, the number of travelers at a particular stop may vary over the course of hours, and the like. This problem is generally compounded when variable amounts of data are received for different portions of the network, i.e., one vehicle may have better recording sensors or devices than another, a vehicle may lack recording devices, but stops do, and the like.

Current transportation network planning and management may fail to account for various factors that affect this series of temporal events. For example, weather impacts the number of users of a public transportation system. When it is raining, the number of travelers on the public transportation system may drop, as those with cars will take their personal vehicles to avoid walking or waiting in the rain. Similarly, the time or day or day of the week may also impact demand on segments of the transportation network. For example, the time of day may impact the demand (i.e., rush hour), and the day of the week (i.e., lower travel on weekends) impact any prediction or modeling. Traffic on the transportation network may also factor in modeling and prediction, as heavy automobile traffic may increase demand on the public transportation network, construction, etc. Such series of temporal events may be related to each other, but current methodologies do not factor this when modeling and predicting demand.

Figure 1A:
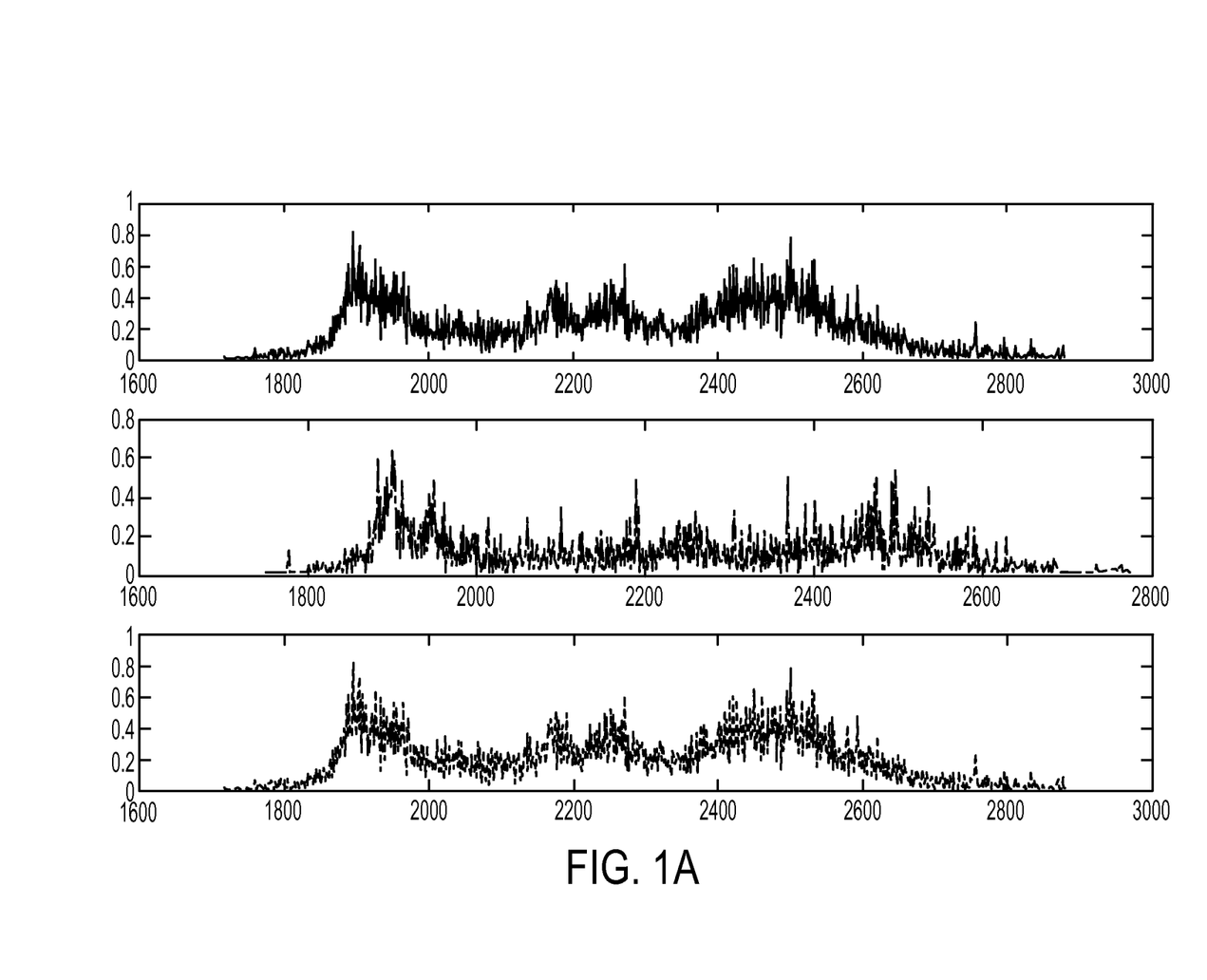
FIG. 1A illustrates travel demand of three routes for one day.
Figure 1B:
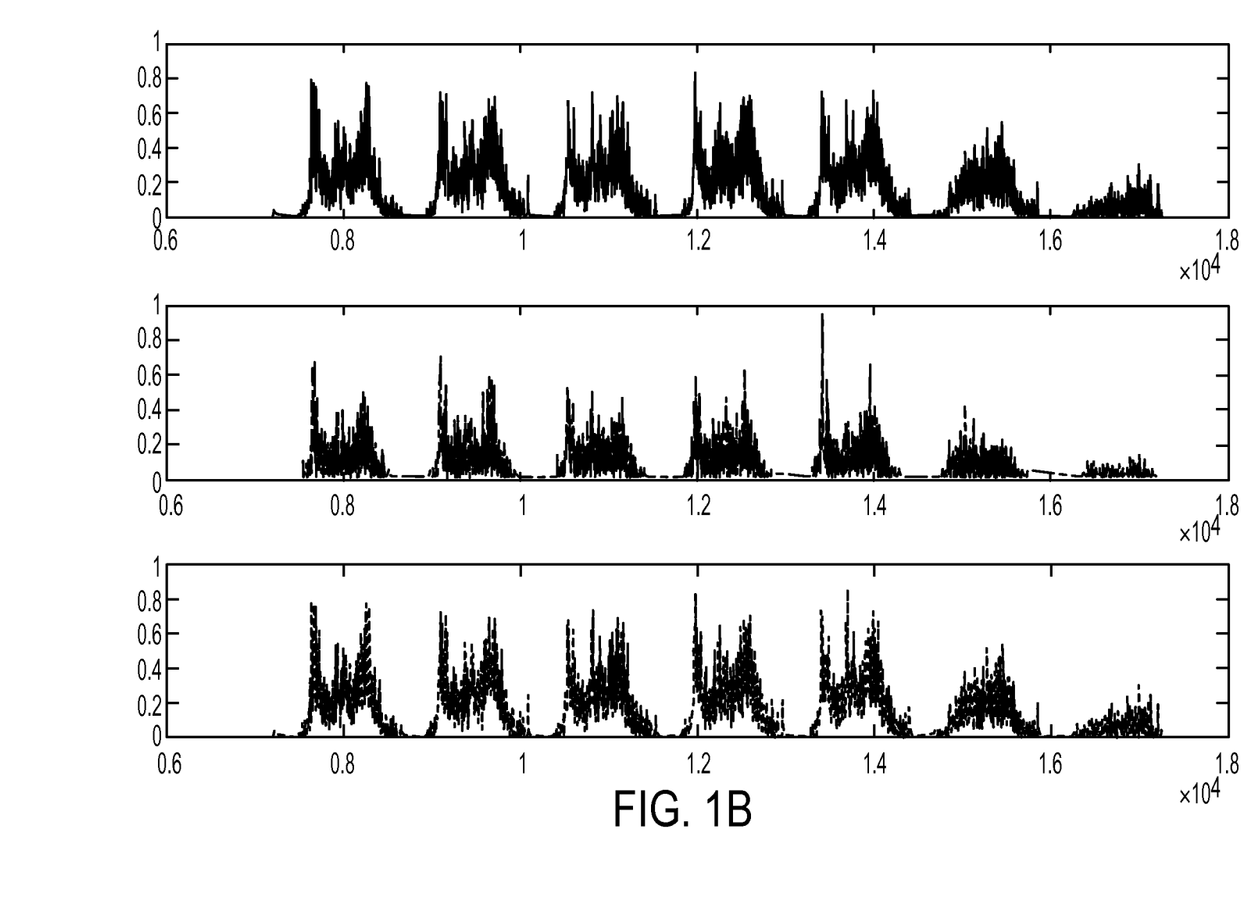
FIG. 1B illustrates travel demand of the three routes of FIG. 1A for one week.

For example, FIGS. 1A-1B depicts three time series representing passenger load at different routes in a particular city. In each series, the number of passengers boarding public vehicles during a certain period of time is shown over the course of a day and then over the course of a week. As depicted in FIG. 1A, each route varies over the course of a day, and as depicted in FIG. 1B, each route varies over the course of a week. In conventional planning and management, each of these entities are modeled differently, i.e., different tasks must be performed.

Multi-task learning is a form of inductive transfer, machine learning that focuses on storing knowledge gained while solving one problem and applying it to a different, but related problem. That is, multi-task learning is aimed at leveraging the information of multiple, mutually related learning tasks to make more accurate predictions for the individual tasks. Related information contained in task can be exploited to mutually increase the quality of predictions. For example, multi-task learning has been applied to several different domains, e.g., computational biology, natural language processing, computer vision, and the like, where multiple biological, textual and visual object classes may share some of the relevant features. In multi-task learning, the prediction accuracy in each task is leveraged by making use of data from the other tasks, e.g., regularization, mutualization, and the like.

Thus, it would be advantageous to provide an efficient system and method for predicting travel demand across a transportation network utilizing multi-task learning.

INCORPORATION BY REFERENCE

The following references, the disclosures of which are incorporated herein by reference, in their entirety, are mentioned.

U.S. Pat. No. 7,756,341 to Perronnin, issued on Jul. 13, 2010 and entitled GENERIC VISUAL CATEGORIZATION METHOD AND SYSTEM.

Leiva-Murillo, Jose M. et al., *Multitask SVM Learning for Remote Sensing Data Classification*, Proc. SPIE 7830, Image and Signal Processing for Remote Sensing XVI, 78300L (Oct. 22, 2010).

Müller, K. R. et al., *Predicting Time Series with Support Vector Machines*, Proceedings of the $7^{th}$ International Conference on Artificial Neural Networks, pages 999-1004, Oct. 8-10, 1997.

Rüping, Stefan. *SVM Kernels for Time Series Analysis*, CS Dept., AI Unit, University of Dortmund, Dortmund, Germany, 2001.

Sapankevych, Nicholas I. et al., *Time Series Prediction Using Support Vector Machines: A Survey*. IEEE Computational Intelligence Magazine, May 2009, pages 24-38.

Smola, Alex J. et al., *A Tutorial on Support Vector Regression*, Royal Holloway College, London, UK, NeuroCOLT Tech. Rep., 1998.

U.S. patent application Ser. No. 13/553,614, to Chidlovskii et al., filed on Jul. 19, 2012 and entitled TRAFFIC DELAY DETECTION BY MINING TICKET VALIDATION TRANSACTIONS.

BRIEF DESCRIPTION

In one aspect of the exemplary embodiment, a multi-task learning method for predicting travel demand on an associated transportation network is provided. The method includes collecting observation data corresponding to a plurality of observations of the associated transportation network, and generating a set of time series corresponding to transportation network data of segments of the associated transportation network. The method also includes forming a plurality of clusters of time series, each time series in the set thereof in one cluster, and for each cluster, applying multi-task learning to generate a prediction model. The method further includes predicting travel demand on a selected segment of the associated transportation network corresponding to at least one of the set of time series in accordance with the generated prediction model. The method also includes that at least one of the collecting, generating, forming, and predicted is performed by a computer processor.

In another aspect, a system for predicting travel demand on an associated transportation network is provided. The system includes a time series generator component configured to generate a set of time series corresponding to segments of the associated transportation network. The system also includes a multi-task learning module configured to generate a prediction model for each of a plurality of clusters of time series. In addition, the system includes memory which stores instructions for collecting, from a plurality of collection components, transportation network data corresponding to the segments of the associated transportation network, and receiving observation data corresponding to a plurality of observations associated with the transportation network. The memory further stores instructions for predicting travel demand on a selected segment of the associated transportation network in accordance with the received observation data and the prediction model of the cluster with which the time series corresponding to the selected segment is associated. The system further includes a processor in communication with the memory which executes the instructions.

In another aspect, a computer-implemented multi-task learning method for predicting travel demand on an associated transportation network is provided. The method includes collecting data corresponding to the associated transportation network, the data including at least one of observation data and transportation network data. The method also includes generating a set of time series corresponding to segments of the associated transportation network in accordance with at least one of the observation data or the transportation network data. In addition, the method includes measuring a similarity between each pair of the set of time series via dynamic time warping, and forming a plurality of clusters of time series based upon the measured similarity of each pair of time series. The method further includes applying, for each cluster, multi-task learning support vector regression to generate a prediction model. The method also includes predicting travel demand on a selected segment of the associated transportation network corresponding to at least one of the set of time series in accordance with the generated prediction model.

DETAILED DESCRIPTION

One or more embodiments will now be described with reference to the attached drawings, wherein like reference numerals are used to refer to like elements throughout. Aspects of exemplary embodiments related to systems and methods for multi-task learning of related and unrelated time series are described herein. In addition, example embodiments are presented hereinafter referring to travel demand prediction on transportation networks, however application of the systems and methods set forth can be made to other areas of time series analysis and prediction operations.

Figure 2A:
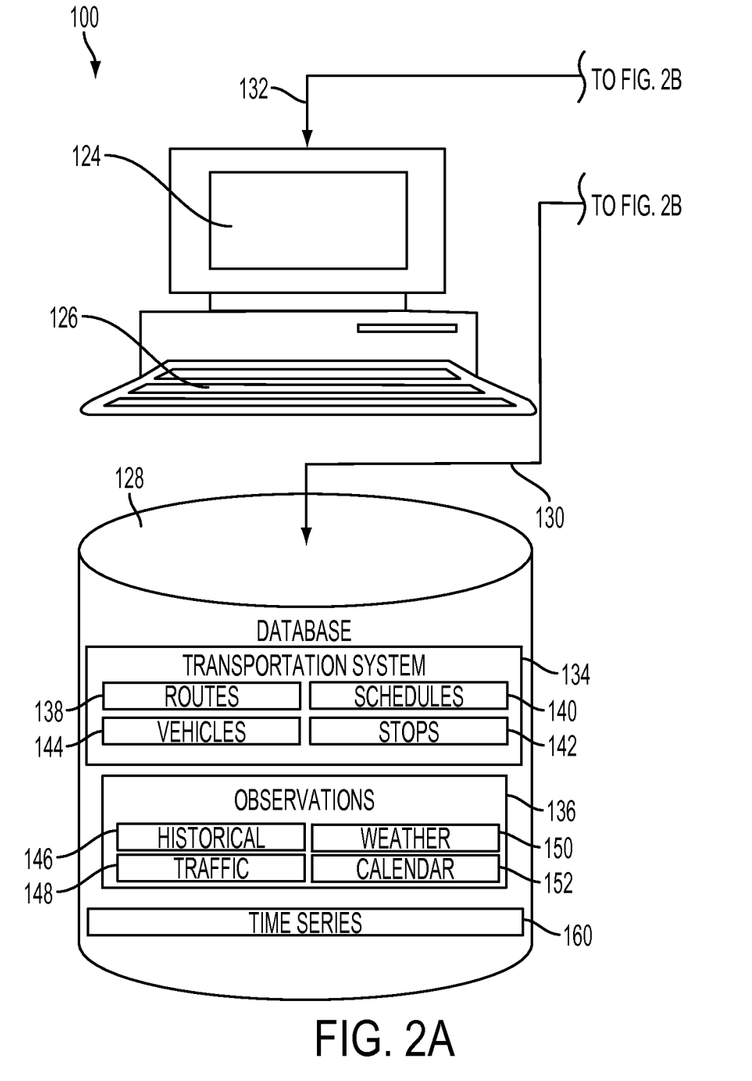
FIGS. 2A-2B are functional block diagram of a multi-task learning system for predicting travel demand on an associated transportation network in accordance with one aspect of the exemplary embodiment.
Figure 2B:
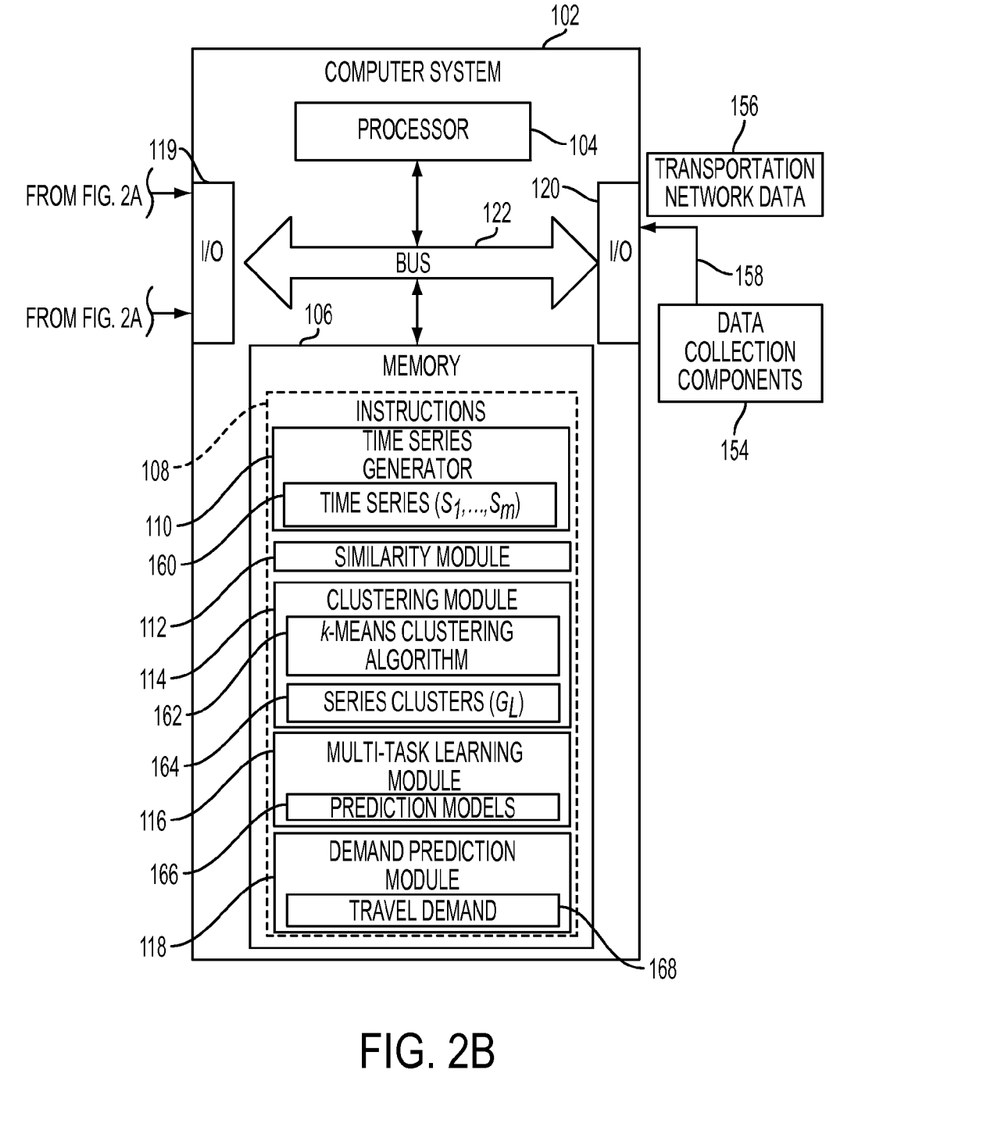

Referring now to FIGS. 2A-2B, there are shown a functional block diagram of a multi-task learning system 100 for predicting travel demand on an associated transportation system in accordance with one aspect of the subject disclosure. It will be appreciated that the various components depicted in FIGS. 2A-2B are for purposes of illustrating aspects of the exemplary embodiment, and that other similar components, implemented via hardware, software, or a combination thereof, are capable of being substituted therein.

As used herein, a transportation system includes a transportation network that includes a predefined set of routes. The routes are each traveled by one or more transportation vehicles of the transportation system, such as public transport vehicles, according to predefined schedules. The transportation vehicle may be of the same type or different types (bus, train, tram, or the like). In one embodiment, the transportation vehicles are buses or trams. There may be five, ten or more routes on the transportation network. Each route has a plurality of predefined stops which are spaced in their locations and in most or all cases, a route has at least three, four, five or more stops. A traveler, i.e., a passenger, may select a first stop on one of the predefined routes from the set of available stops on the route to board the vehicle and a second stop along the route to alight from the vehicle.

As shown in FIGS. 2A-2B, the searching system 100 includes a computer system represented generally at 102, which is capable of implementing the exemplary method described below. It will be appreciated that while shown with respect to the computer system 102, any suitable computing platform may be utilized in accordance with the systems and methods set forth herein. The exemplary computer system 102 includes a processor 104, which performs the exemplary method by execution of processing instructions 108 which are stored in memory 106 connected to the processor 104, as well as controlling the overall operation of the computer system 102.

The instructions 108 include a time series generator 110 operable to generate a set of time series 160, denoted as $S_1, \ldots, S_m$, from transportation network data 156 collected by various data collection components 154 disposed on the transportation system 134. As discussed above, a time series 160 represents some entity that changes over time, e.g., travel demand at on a route 138, at a stop 142, on a vehicle 144, or the like. In accordance with one embodiment, a time series 160 may be represented as $S_i=(y_{i1}, \ldots, y_{in})$ such that a goal of time series prediction is to estimate value y at time i based on past values at time i–1, i–2, .... In one embodiment, the depth is limited to the last k values: $y_i=f(y_{i-k}, y_{i-k+1}, \ldots, y_{i-1})$, i=k, ..., n, where k≥1 is the modeling depth, as discussed in greater detail below with respect to FIGS. 3-4B. It will be appreciated that while discussed hereinafter with respect to travel demand, the time series generator 110 is capable of adaptation to other prediction demands, and travel demand is used herein as an example application of the systems and methods set forth herein.

The instructions 108 further include a similarity module 112 configured to determine a similarity between each of a pair of time series 160 of a set thereof. In one embodiment, a set of time series 160 is generated by the time series generator 110 in response to data collected from the transportation network 134 (discussed below). The similarity module 112 is configured to calculate a similarity between pairs in the set of the time series 160. The similarity module 112 may utilize dynamic time warping (DTW) in determining a similarity value between a pair of time series 160, i.e., a suitable algorithm for measuring similarity between two series varying in time or speed. That is, the similarity module 112 determines whether a pair of time series 160 $(S_i, S_j)$, $1 \leq i < j \leq k$, are related, i.e., whether a selected pair of time series 160 are mutually related by behaving similarly and exhibiting the same tendencies. It will be appreciated that DTW takes into account temporal and dynamic aspects and better interprets similarity between pairs more than a standard element-wise alignment of two series. For example, two bus stops may exhibit the same behavior of travel demand, with one being shifted in time, due to the time buses take to drive from one stop to another. Accordingly, the inclusion of DTW takes the time shift into account.

As shown in FIGS. 2A-2B, the instructions 108 further includes a clustering module 114 configured to utilize the output of the similarity module 112 to form clusters $G_1$, $G_2$, ..., $G_L$, 164 of the time series 160 using k-means clustering algorithm 162 having DTW distances $S_{rt}$ between them. In one embodiment, each time series 160 belongs to a single cluster 164. In accordance with another embodiment, clustering preselected threshold value Th (not shown) may be used utilized in forming the clusters $G_1$, $G_2$, ..., $G_L$, 164. In such an embodiment, suitable threshold values (Th) may be either defined by a domain expert or detected by a series of experiments. As will be appreciated, a suitable k-means clustering algorithm 162 is representative of a method of cluster analysis that aims to partition the set of time series 160 into k clusters (e.g., clusters $G_1$, $G_2$, ..., $G_L$, 164) in which each series belongs to the cluster with the nearest mean. The distance between two clusters is suitably defined by the DTW values.

The instructions 108 also include a multi-task learning module 116 configured to perform multi-task learning (discussed in greater detail below) on each cluster 164 of time series 160 so as to produce one or more prediction models 166. That is, the multi-task learning module 116 is capable of applying one or more multi-task learning methodologies to the clusters 164 and outputting a suitable common model 166 associated with travel demand prediction of that cluster 164. In one embodiment, the multi-task learning module 116 utilizes various observations 136 associated with time series 160 being analyzed in particular clusters 164. For example, when the tasks correspond to predicting travel demand 168 on several routes 138 (as indicated by corresponding time series 160 for each route 138) and the several routes 138 are similar enough (via DTW by the similarity module 112 to be clustered together via the clustering module 114), the multi-task learning module 116 may learn the prediction model 166 common to the several series 160 in the cluster 164 as discussed below. This prediction model 166 may then be communicated to a demand prediction module 118 to predict the travel demand 168 along each of the several routes 138.

Thus, the instructions 108 also include the demand prediction module 118 that is configured to receive one or more prediction models 166 from the multi-task learning module 116. The demand prediction module 118 may then calculate travel demand 168 for segments of the transportation network 134 (routes 138, stops 142, vehicles 144, etc.) corresponding to the time series 160 associated with the prediction model(s) 166. In one embodiment, the demand prediction module 118 incorporates the various external factors associated with the time series 160, i.e., observations 136 (historical data 146, traffic data 148, weather 150, calendar data 152, etc., when predicting the travel demand 168 corresponding thereto.

The computer system 102 may include one or more input/output (I/O) interface devices 119 and 120 for communicating with external devices. The I/O interface 119 may communicate, via communications link 132, with one or more of a display device 124, for displaying information such as returned images, search results, queries, and the like, and a user input device 126, such as a keyboard or touch or writable screen, for inputting text, and/or a cursor control device, such as a mouse, trackball, or the like, for communicating user input information and command selections to the processor 104.

The various components of the computer system 102 associated with the system 100 may all be connected by a data/control bus 122. The processor 104 of the computer system 102 is in communication with associated data storage device 128 via a communications link 130 coupled to the I/O interface 119. A suitable communications link 130 may include, for example, the public-switched telephone network, a proprietary communications network, infrared, optical, or other suitable wired or wireless data communications channel. The data storage device 128 is capable of implementation on components of the computer system 102, e.g., stored in local memory 106, i.e., on hard drives, virtual drives, or the like, or on remote memory accessible to the computer system 102.

The associated data storage device 128 corresponds to any organized collection of data (e.g., validation information, vehicles, transportation system segments, transportation system zones, routes, schedules, locations, usage information, travel demand) used for one or more purposes. Implementation of the associated data storage device 128 is capable of occurring on any mass storage device(s), for example, magnetic storage drives, a hard disk drive, optical storage devices, flash memory devices, or a suitable combination thereof. The associated data storage 128 may be implemented as a component of the computer system 102, e.g., resident in memory 106, or the like.

In one embodiment, the associated data storage device 128 may include information corresponding to the transportation system 134, a collection of routes 138 (a sequence of stops 142 by an individual vehicle 144 along a course of travel available on the transportation system 134), schedules 140 that pertain to the arrival/departure times of buses, trams, subways or other vehicles 144, etc., of the transportation system 134, stops 142 along routes 138 at which passengers may board or alight vehicles, information relating to various vehicles 144 traveling the transportation system 134, and the like.

The data storage device 128 may further store observations 136 associated with the transportation system 134, such as historical data 146, traffic data 148, weather data 150, calendar data 152, and the like. Historical data 146 generally includes information relating to the travel demand 168 on the transportation system 134 covering a selected time period, and accounting for all passengers boarded at all stops and routes on the transportation system 134. Traffic data 148 may describe the traffic status on a network segment relevant to any given task, e.g., time series on the segment, or the like. Traffic data 148 may include construction detours, re-routings, accident information, and the like. Weather data 150 may be collected from third-party sources (meteorological services) or directly from sensors (not shown) along routes 138, at stops 142, on vehicles 144, or the like. Such weather data 150 may include minimum and maximum air temperature, air humidity, precipitation, wind speed, wind direction, etc. Such weather data 150 may be registered on the computer system 102 and stored in the data storage 128 at regular reporting intervals, e.g., every fifteen minutes, every hour, every set of hours, etc. In some embodiments, forecasted weather patterns may be included in the stored weather data 150. Calendar data 152 may include information relating to school days, school vacations, sporting events, public holidays, scheduled closings, construction information, etc.

It will be appreciated that the multi-task learning system 100 for predicting travel demand illustrated in FIGS. 2A-2B is capable of implementation using a distributed computing environment, such as a computer network, which is representative of any distributed communications system capable of enabling the exchange of data between two or more electronic devices. It will further be appreciated that such a computer network includes, for example and without limitation, a virtual local area network, a wide area network, a personal area network, a local area network, the Internet, an intranet, or any suitable combination thereof. Accordingly, such a computer network comprises physical layers and transport layers, as illustrated by various convention data transport mechanisms, such as, for example, Token-Ring, Ethernet, or other wireless or wire-based data communication mechanisms. Furthermore, while depicted in FIGS. 2A-2B as a networked set of components, the systems and methods discussed herein are capable of implementation on a stand-alone device adapted to perform the methods described herein.

The computer system 102 may further be in communication with one or more data collection components 154 distributed at stops 142, on vehicles 144, at stations or ticketing machines, or the like, via a communications link 158 with the I/O interface 120. In some embodiments, the data collection components 154 may correspond to automated ticketing devices, such as smart card readers, magnetic card readers, input terminals, ticket dispensers, ticket readers, and the like, and may collect information about travelers related to boardings, alightings, destinations, origins, date/time, costs, or the like. In one embodiment, the computer system 102 is in data communication with such data collection components 154 via a suitable communications link 158. Such a communications link 158 may include, direct wired or wireless connection, networked connection (i.e., via the Internet, an intranet, etc.), and may utilize various connection mediums, such as the public switched telephone network, a proprietary communications network, infrared, optical, or any other suitable wired or wireless data transmission communications mediums.

In one embodiment, transportation network data 156 is collected by the data collection devices 154 corresponding to travelers on the transportation system 134. Such information may include observations 136, such as current usage information as to the number of travelers, time/date information, validation information (tickets sold, tickets redeemed, passengers alighting at a station, passengers boarding at a station, passengers boarding on a vehicle 144, or the like). Various other information may also be communicated from the data collection devices 154 to the computer system 102 via the communications link 158. For example, information relating to the status and environment of a vehicle 144 on which a collection device 154 is affixed, such as position (e.g., GPS, direction, street location, stop location, etc.), speed, acceleration, vehicle maintenance information, temperature, time/date, etc. Another source of information are road-side sensors mobile phone sensors measuring the road and traffic conditions.

The computer system 102 may include a computer server, workstation, personal computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like.

The memory 106 may represent any type of non-transitory computer readable medium such as random access memory (RAM), read only memory (ROM), magnetic disk or tape, optical disk, flash memory, or holographic memory. In one embodiment, the memory 106 comprises a combination of random access memory and read only memory. In some embodiments, the processor 104 and the memory 106 may be combined in a single chip. The network interfaces 119 and/or 120 may allow the computer system 102 to communicate with other devices via a computer network, and may comprise a modulator/demodulator (MODEM). Memory 106 may store data processed in the method as well as the instructions for performing the exemplary method.

The digital processor 104 can be variously embodied, such as by a single core processor, a dual core processor (or more generally by a multiple core processor), a digital processor and cooperating math and/or graphics coprocessor, a digital controller, or the like. The digital processor 104 in addition to controlling the operation of the computer system 102, executes the instructions 108 stored in the memory 106 for performing the method outlined in FIGS. 3-4B.

The term "software," as used herein, is intended to encompass any collection or set of instructions executable by a computer or other digital system so as to configure the computer or other digital system to perform the task that is the intent of the software. The term "software," as further used herein, is intended to also encompass such instructions stored in storage mediums, such as RAM, a hard disk, optical disk, or so forth, and is intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
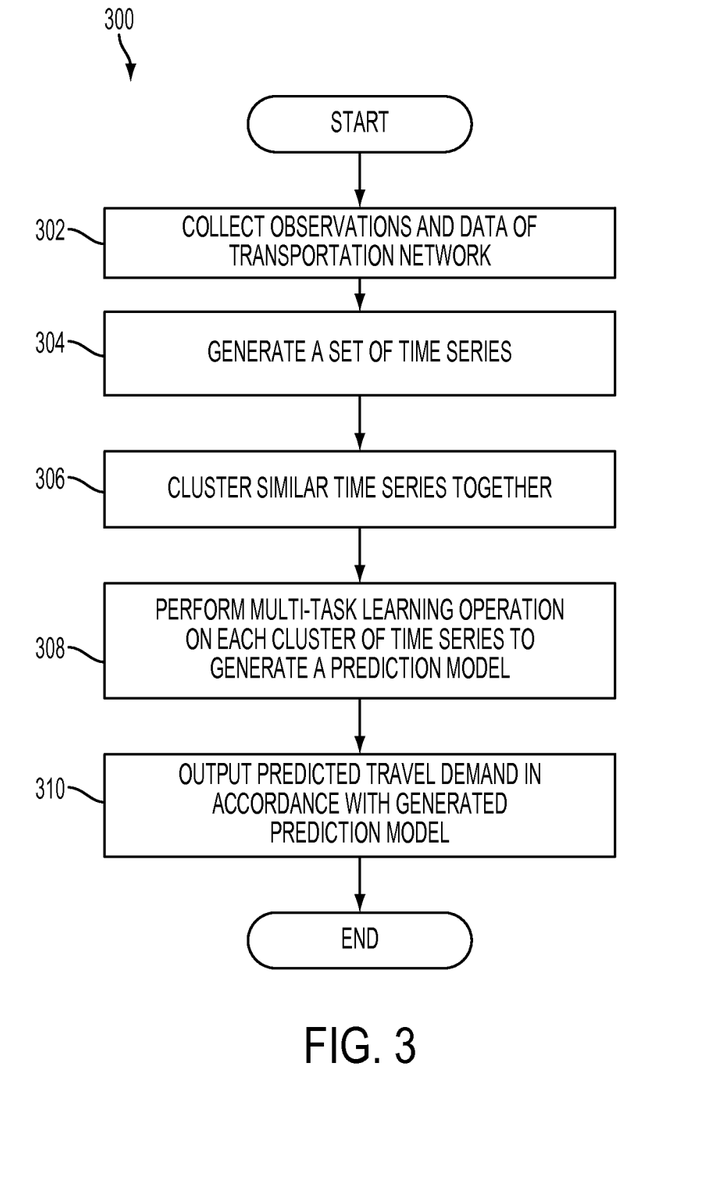
FIG. 3 is a flowchart that illustrates one aspect of the multi-task learning method for predicting travel demand on an associated transportation network according to an exemplary embodiment.
Figure 4A:
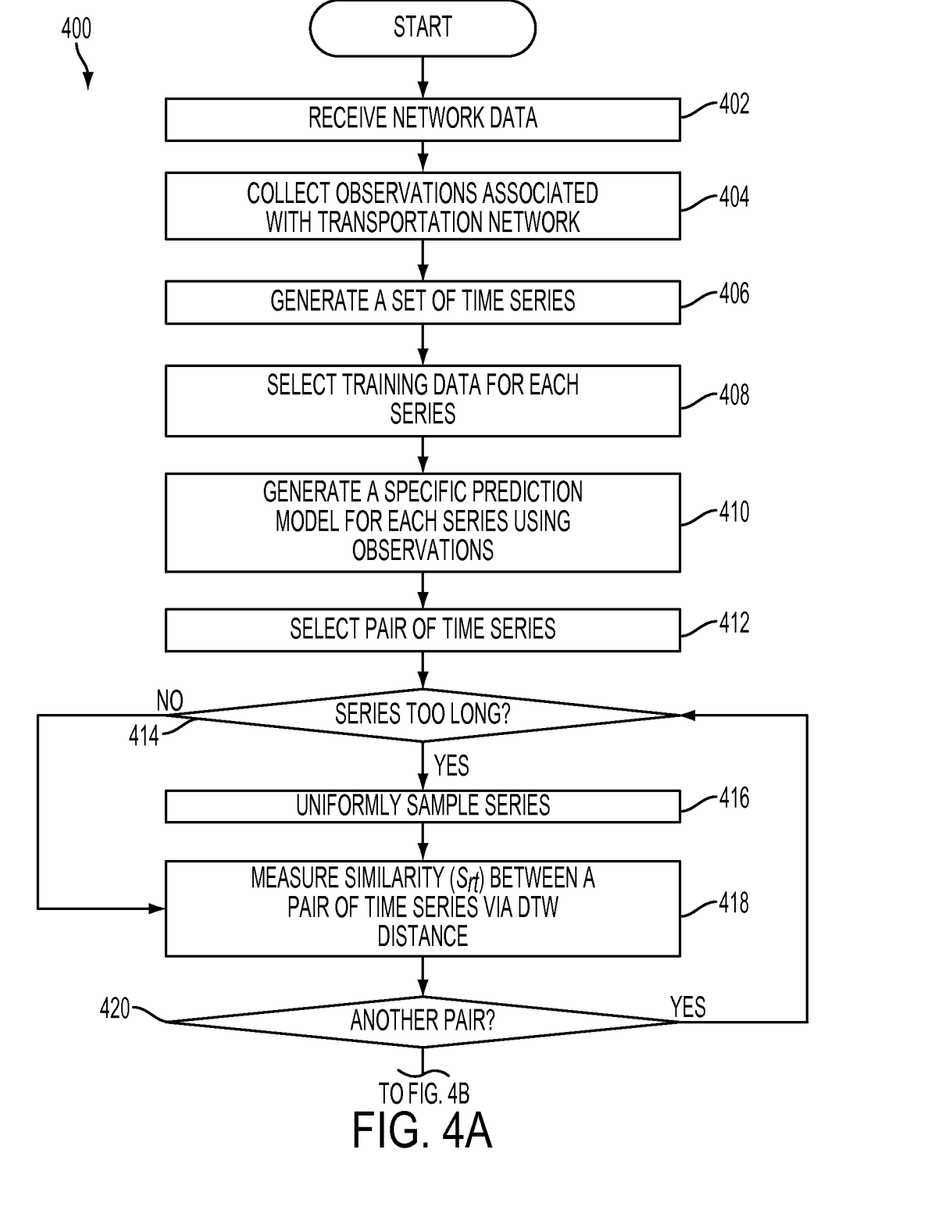
FIGS. 4A-4B are a flowchart that illustrates another aspect of the multi-task learning method for predicting travel demand on an associated transportation network according to an exemplary embodiment.

Turning now to FIG. 3, there is provided an overview of the exemplary multi-task learning method for predicting travel demand on an associated transportation network. The method 300 begins at 302, whereupon the computer system 102 collects observations 136 from the associated transportation network 134. In some embodiments, the observations 136 may be collected via various collections devices 154 positioned at stops 142, on vehicles 144, stations, or the like associated with the transportation network 134. For example, automated ticketing devices may be used to collect the observations 136 associated with the transportation system 134. The observations 136 may include, for example and without limitation, historical data 146 corresponding to historical traveler usage of a particular route 138, vehicle 144, stop 142, etc., weather data 150 from a third party source or observed for various times/days, traffic data 148 collected via observations, sensors, third party reports, etc., calendar data 152 such as holidays, vacations, day of the week, sporting or civic events, etc., or other observations 136 that may impact the functioning of the transportation network 134 or relate to travel demand 168 thereon.

At 304, a set of time series ($S_1, \ldots, S_m$) 160 is then generated in accordance with data collected from the transportation network 134 For example, the time series 160 may represent the number of passengers boarding or alighting at stops 142 on a route 138, the number of travelers on a route 138 at different points in time, or the like. In one embodiment, a time series 160 may be represented as $S_i=(y_{i1}, \ldots, y_{in})$ such that a goal of time series prediction is to estimate value y at time i based on past values at time i−1, i−2, . . . . In one embodiment, the depth is limited to the last k values: $y_i = f(y_{i-k}, y_{i-k+1}, \ldots, y_{i-1})$, i=k, . . . , n, where k≥1 is the modelling depth. Moreover, it can also take into account a number of external characteristics $v_i$ at time i which may have impact on the series values:

$$y_i = f(v_i, y_{i-k}, y_{i-k+1}, \ldots, y_{i-1}), i=k, \ldots, n \quad (1)$$

Accordingly, the objective of time series prediction is to find a function $f(x_i)$, where $x_i=(v_i, y_{i-k}, y_{i-k+1}, \ldots, y_{i-1})$ such that $\hat{y}_i$, the predicted value of the time series at a future point in time, is consistent and minimize a regularized fit function. It will be appreciated that time series 160 are outcome of stochastic dynamical systems and may be analyzed by using standard methods, e.g., Fourier transform and phase space, etc. That is, Fourier transforms connect the time series to frequencies. The motivation for the Fourier transform comes from the study of Fourier series where complicated but periodic functions are approximated as the sum of simple waves mathematically represented by sine and cosine functions. Second, the concept of a phase space permits to model the collection of possible states when modelling of system dynamics. The system state at time t consists of all information needed to determine the future system states.

At 306, similar tasks, or series 160, are grouped or clustered together via operations of the clustering module 114 of the system 102. As will be appreciated, the application of multi-task learning to unrelated sets of time series 160 may have a negative impact on the prediction quality. Accordingly, the similarity module 112 determines whether a pair of time series 160 ($S_i, S_j$), 1≤i<j≤k, are related. That is, the systems and methods set forth herein determine whether a pair of time series 160 are mutually related if they behave similarly and exhibit the same tendencies. The similarity between two series 160 may be determined via DTW or other suitable algorithm for measuring similarity between two series 160 varying in time or speed.

As discussed above, DTW takes into account temporal and dynamic aspects and better interprets similarity between pairs of time series 160 more than a standard element-wise alignment of two series 160. For example, two bus stops 142 may exhibit the same behavior of travel demand 168, with one being shifted in time, due to the time buses take to drive from one stop 142 to another. Accordingly, the inclusion of DTW takes the time shift into account. The clustering module 114 accordingly applies k-means clustering algorithm 162 to form L clusters $G_1, G_2, \ldots, G_L$, 164 of the time series 160 using the DTW distances similarity ($S_{rt}$) between them., where $S_{rt}$ is the similarity between series 160 (e.g., $y_r, y_t$) by the dynamic time warping distance, as explained in Algorithm 1 below. Alternatively, the clustering module 114 may form clusters $G_1, G_2, \ldots, G_L$, 164 of the time series 160 having DTW values less than a preselected threshold value Th, with each time series 160 belonging to a single cluster 164. For example, as illustrated in FIGS. 1A-1B, the time series 1 and 3 and the time series 2 clearly look different and accordingly should belong to different clusters 164.

At 308, for each cluster $G_L$ 164 of related tasks, or series 160, a multi-task learning operation is performed thereon by the multi-task module 116 to generate a prediction model 166 associated with the corresponding cluster 164 of time series 160. In one embodiment, the system 100 employs multi-task support vector regression to ascertain a model 166 common to each task or series 160 in a given cluster 164. It will be appreciated that when a time series 160 or task is not similar to any other series 160 (based upon the DTW performed by the similarity module 112), support vector regression (SVR) may be used on the series 160 to generate a prediction model 166 corresponding to that particular series 160. Generally, a Support Vector Machine (SVM) is used for different tasks, such as pattern recognition, object classification, and in the case of times series, prediction regression analysis. That is, Support Vector Regression (SVR) may be used, which is a function for a time series that is estimated using observed data. Being a data-driven methodology, SVMs differ from more traditional time series prediction methodologies, like ARIMA or Kalman Filter. Given a set of time series data ($x_i, y_i$), i=1, . . . , n, a time series prediction algorithm defines a function $f(x)$ that will have an output equal to the predicted value for some prediction horizon. By using regression analysis, the prediction function for the linear regression is defined as $f(x) = w^T x + b$. If the data is not linear in its input space, the data x are mapped into a higher dimension space, via a kernel function $\phi(x)$ to allow the performance of a linear regression in the higher dimensional feature space:

$$f(x) = w^T \phi(x) + b.$$

The goal is therefore to find optimal weights w and threshold b, as well as to define the criteria for finding an optimal set of weights.

Given training data ($x_i, y_i$), i=1, . . . , n, $x_i \in R^d$, $y_i \in R$, SVM first maps input vectors x onto the feature space $\Phi$, $\phi(x) \in \Phi$ and then approximates the regression by a linear function $f(x) = w^T \phi(x) + b$. This is obtained by solving the following optimization problem in the $\epsilon$-insensitive tube:

$$\text{minimize } \frac{1}{2}\|w\|^2 + C\sum_{i=1}^{n}(\xi_i + \xi_i^*) \quad (2)$$

$$\text{subject to } \begin{cases} y_i - (w^T \phi(x_i) - b) \le \varepsilon + \xi_i \\ (w^T \phi(x_i) + b) - y_i \le \varepsilon + \xi_i^*, i = 1, \ldots, n \\ \xi_i^* \ge 0, \xi_i \ge 0, i = 1, \ldots, n \end{cases}$$

where $\xi_i, \xi_i^*$, i=1, . . . , n are slack variables, measuring the deviation from $\epsilon$-insensitive tube, C is the regularization parameter.

In accordance with one embodiment, the multi-task learning at 308 employed by the multi-task learning module 116, may utilize multi-task SVM regression as follows. Each cluster $G_L$ 164, i.e., set of related time series 160, may be expressed as a set of m related time series, m>1. Training samples are represented as a set $\{(x_{ri}, y_{ri}), r=1, \ldots, m, i=1, \ldots, n\}$, wherein the indices from series r by $T_r = \{i_{r1}, \ldots, i_{rn}\}, r=1, \ldots, m$. In such an implementation, it may be assumed that each series in the set has the same length n.

As each series in the set of m series has been determined to be similar (i.e., based upon outputs of the similarity module 112 and the clustering module 114), it may be assumed that the tasks, e.g., the time series 160, are related in a way that the true models 166 are all close to some common model w and every task model $w_r$ can be written as $w+w_r, r=1, \ldots, m$, where the individual vectors $w_r$ are small when the tasks are similar to each other.

The regularization approach may then be adapted, according to which vectors of each task $x_i, i \in T_r$ are mapped into two different spaces. One is a space $\Phi$ common to all tasks, $\phi(x) \in \Phi$; another is a correction space $\Phi_r$, specific to every task r, $\phi_r(x_i) \in \Phi_r$.

Individual task information is accounted in the slack variables, defined as follows:

$$lcl\xi_i = w_r^T\phi(x_i) + b_r, i \in T_r, r=1, \ldots, m\xi^*_i = w_r^T\phi(x_i) + b^*_r, i \in T_r, r=1, \ldots, m. \quad (3)$$

In accordance with one embodiment, all slack variables are non-negative, $\xi_r(x_i), \xi^*_r(x_i) \geq 0, r=1, \ldots, m$. Thus samples mapped in the correcting space have to lie on one side of the corresponding correcting function. The correcting function also has to pass through some points with slack variables being zero.

The goal of the MTL version of SVR is to estimate m regression models 166, one model per task, e.g., per series 160, cluster 164, etc. MTL SVR incorporates individual task information into estimated regression functions through the slack variables. The following parameterized functions for m regression models 166 may be specified:

$$f(x) + f_r(x) = w^T\phi(x) + w_r^T\phi_r(x) + b_r, r=1, \ldots, m, \quad (4)$$

where $f(x) = w^T\phi(x) + b$ is the common estimation function and $f_r(x) = w_r^T\phi_r(x) + b_r$ is a correction function for series r, r=1, \ldots, m. Therefore, the multi-task learning SVR formulation solves the following optimization problem:

$$\text{minimize } \frac{1}{2}\|w\|^2 + \mu\sum_{i=1}^{t}\|w_r\|^2 + C\sum_{i=1}^{n}(\xi_i^r + \xi_i^{r*}) \quad (5)$$

$$\text{subject to } \begin{cases} y_i^r - (w^T\phi(x_i) + b + w_r^T\phi_r(x_i) + b_r) \leq \varepsilon + \xi_i^r \\ (w^T\phi(x_i) + b + w_r^T\phi_r(x_i) + b_r) - y_i^r \leq \varepsilon + \xi_i^{r*} \\ \xi_i^{r*} \geq 0, \xi_i^r \geq 0, i=1, \ldots, n, r=1, \ldots, m. \end{cases}$$

where $\mu$ is a regularization parameter for the individual correction functions. Using the dual optimization technique (similar to standard SVM discussed below), the dual form of the above optimization problem is as follows:

$$\text{maximize } -\varepsilon\sum_{i=1}^{n}(\alpha_i^* + \alpha_i) + \sum_{i=1}^{n}(\alpha_i^* - \alpha_i)y_i \quad (6)$$

$$-\frac{1}{2}\sum_{i,j=1}^{n}(\alpha_i^* - \alpha_i)(\alpha_j^* - \alpha_j)\phi(x_i)^T\phi(x_j)$$

$$-\frac{1}{2\mu}\sum_{r=1}^{t}\sum_{i,j\in T_r}^{n}(\alpha_i^* - \alpha_i)(\alpha_j^* - \alpha_j)\phi_r(x_i)^T\phi_r(x_j)$$

$$\text{subject to } \begin{cases} \sum_{i\in T_r}(\alpha_i^* - \alpha_i) = 0, r=1, \ldots, m, \\ 0 \leq \alpha_i, \alpha_i^* \leq C, i=1, \ldots, n. \end{cases}$$

Then vectors w, $w_r$ can be expressed in terms of training samples:

$$w = \sum_{i=1}^{n}(\alpha_i^* - \alpha_i)\phi(x_i), \quad (7)$$

$$w_r = \frac{1}{\mu}\sum_{i\in T_r}(\alpha_i^* - \alpha_i)\phi_r(x_i), r=1, \ldots, m.$$

It should be noted that in addition to usual parameters of individual SVR, C and $\epsilon$, the multi-task learning extension requires also to tune parameter $\mu$.

Thereafter, at 310, the demand prediction module 118 outputs a predicted travel demand 168 corresponding to the vehicles 144, stops 142, and/or routes 138 of the transportation network 134 associated with the input time series 160 in accordance with the prediction model(s) 166 generated via the multi-task learning module 116. That is, the demand prediction module 118 may predict the travel demand 168 on a selected segment of the transportation network 134 utilizing the aforementioned prediction models 166.

Figure 4B:
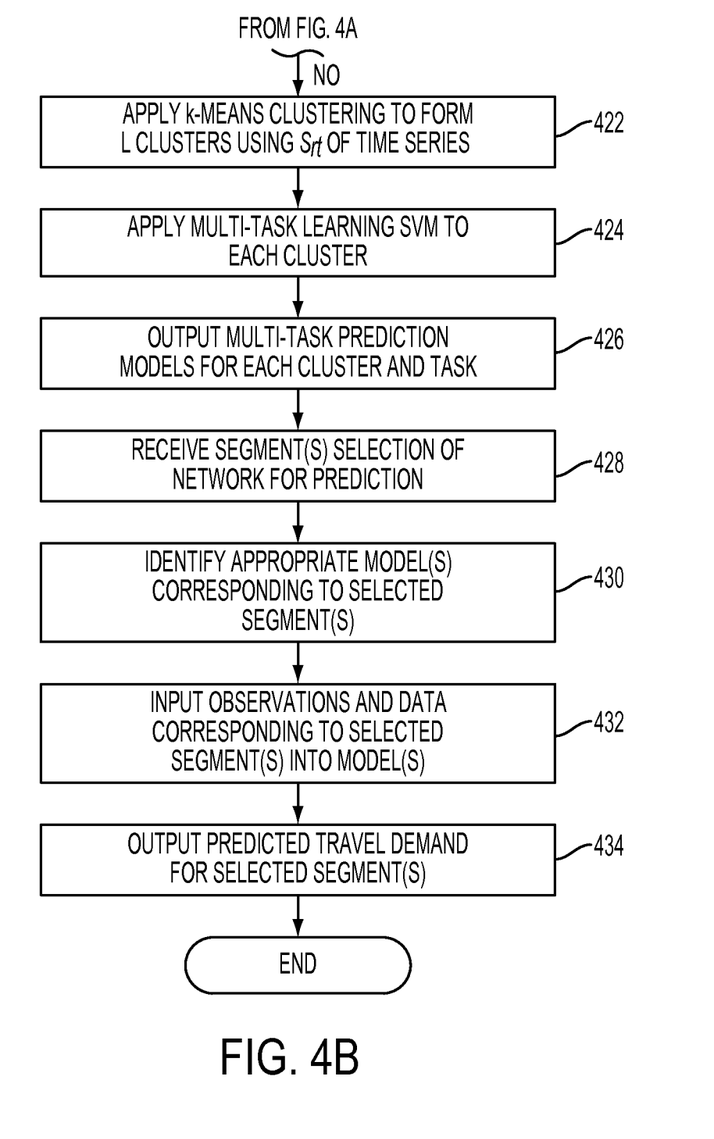

Turning now to FIGS. 4A-4B, there are shown an expanded view of the multi-task learning method 400 for predicting travel demand on an associated transportation system. The method begins at 402, whereupon data 156 is received from collection components 154 on the transportation system 134 by the computer system 102. Observations 136, e.g., historical data 146, traffic data 148, weather data 150, calendar data 152, and the like, are collected by the computer system 102 at 404. Such observations, as will be appreciated, may correspond to any of a myriad of different factors or elements which impact on demand for transportation. For example, the weather data 150 may indicate that it is raining or that rain is forecast. It is generally understood that when raining, less travelers utilize public transportation, instead using their personal conveyances to avoid waiting in the rain, walking to a stop, etc.

At 406, a set of time series 160 is generated from the transportation network data 156 via the time series generator 110 or other suitable component associated with the system 100. The time series 160 may further be generated in accordance with the stored information of the transportation system 134, e.g., routes 138, schedules 140, stops 142, vehicles 144, and the like, such that a particular time series 160 may correspond to a route 138, stop 142, or vehicle 144, as discussed above. In some embodiments, the observations 136 may be incorporated in the analysis of the time series 160. That is, two types of entities may be distinguished that change over time and may but utilized in forming a "time series, i.e., factors to predict (=travel demand) denoted $y_i$ (explicitly referenced above as time series). In addition, another type of entity is observations (denoted $v_i$ and including weather, etc.), wherein the latter may be used to predict first but not themselves. At 408, training data is selected for each series 160 in the set using the collected observations 136, e.g., the historical data 146 corresponding to travel demand 168 on the particular route 138, stop 142, or vehicle 144 associated with the time series 160.

A prediction model 166 specific to each time series 160 is then generated using the collected observations 136 and training data at 410, as discussed in detail above with respect to support vector machine. At 412, a pair of time series is selected and analyzed at 414 to determine whether the time series 160 contain an excess number of elements, i.e., too long (greater than 10,000 elements). Upon a positive determination at 414, operations proceed to 416, whereupon the time series 160 are uniformly sampled. After uniformly sampling of the pair of time series 160 at 416, or upon a determination that the pair of time series 160 is not too long, operations proceed to 418.

At 418, a similarity value is measured, via the similarity module 112, between a pair of time series 160. At 420, a determination is made whether another pair of time series 160 in the generated set thereof remains for analysis. That is, whether at least two time series 160 from the set remains to be processed and have not been compared to determine similarity therebetween. Upon a positive determination at 420, operations return to 414, whereupon a determination is made whether such pair of time series 160 exceeds a length requiring sampling at 416. Operations the proceed through 416-418 as discussed above. When it is determined at 420 that no additional pairs of time series 160 remain to be analyzed, operations proceed to 422.

At 422, a k-means clustering algorithm 162 is applied to form L clusters $G_1, \ldots, G_L$ of time series 160 using the DTW distances $S_{rt}$ between each pair. In one embodiment, each time series 160 may only be present in one cluster 164, i.e., a time series 160 cannot be added to different clusters 164. At 424, multi-task learning SVM is applied to each cluster 164 so as to determine a prediction model 166 common to each series 160 in the cluster 164, discussed above at 308. In accordance with one embodiment, the multi-task learning operation performed at 424 enables the learning of weights associated with the common prediction model and the specific prediction model for the series 160 in a particular cluster 164. That is, the multi-task learning SVM applied to a cluster 164 enables the learning of various weights to be applied to a prediction model 166 for each time series 160 in the cluster 164 to which the SVM is applied. As discussed in detail above at 308, it follows that for every time series 160 (i.e., task) in a cluster 164, the travel demand 168 may be predicted as a sum of the common and the specific models 166.

At 426, multi-task prediction models 166 are output for each cluster 164 and task, i.e., series 160, in accordance with the multi-task learning operations of 424. It will be appreciated that a unpaired tasks, i.e., time series 160 that are not similar to any other, may be individually processed (see SVR above) to generate suitable prediction models 166. At 428, a segment selection (a portion or portions of the transportation network 134, e.g., routes 138, stops 142, vehicles 144, city zones, a series of routes, a set of vehicles and a sequence of stops, etc.), for which a user desires travel demand predictions is received. It will be appreciated that while depicted at 428, the selection of a desired segment of the transportation system 134 can be made prior to model 168 generation, such that only tasks (i.e., time series 160) pertaining to the selected segment(s) are generated. The appropriate prediction models 166 corresponding to the selected segment(s) are then identified at 430 via the demand prediction module or other suitable component associated with the system 100. Collected observations 136 and network data 156 may then be input into the identified prediction models 166 at 432. Thereafter, the demand prediction module 118 outputs predicted travel demand 168 for the selected segment(s) of the associated transportation network 134 at 434.

The methodology 400 depicted in FIGS. 4A-4B may be implemented via the following algorithm representation:

Algorithm 1

Algorithm 1 Multi-task Learning for Related and Unrelated Time Series:
Input: Set of m time series $y_1; \ldots ; y_m$, $y_r=(y_{r1}; \vdots ; y_{rn})$, $r=1, \ldots, m$
Input: Number of clusters L
Input: Observations $(v_r, \ldots, v_{rn})$, including weather, calendar and traffic data, for every series $y_r$.
Output:
1: for every pair $(y_r; y_t)$; $1<=\_r<t<=m$ do
   2: Measure the similarity S between series $y_r$ and $y_t$ by the dynamic time warping (DTW) distance, $S_{rt}=DTW(y_r, y_t)$
   3: If series $y_r$ and $y_t$ are too long (more 10,000 elements), uniformly sample series before applying the DTW algorithm.
4: end for
5: Apply k-means clustering algorithm to form L clusters $G_1, \ldots, G_L$ of times series using DTW distances $S_{rt}$ between them;
6: for cluster $G_i$ of related tasks $y_{i1}, \ldots, y_{im(i)}$, $i=1, \ldots, L$ do
   7: Apply the multi-task learning for time series $y_{i1}, \ldots, y_{im(i)}$ and the relevant observations $v_{i1}, \ldots, v_{im(i)}$,
8: end for
9: return Multi-task models for L clusters of related tasks The following example utilizes algorithm 1 in predicting travel demand 168 in the Nancy, France transportation network. Two alternative learning approaches were tested to train models 166 on multiple time series 160, i.e., first, individual task SVR where a separate SVM regression model 166 was estimated for each task independently, and second, multi-task learning SVR which used multi-task learning to jointly estimate related regression models 166.

In the example implementation, the following components (i.e., observations 136) to train prediction models 166 for travel demand 168 were disposed, either jointly or individually. 1) Historical data 146 of the travel demand 168, which accounted for all passengers that boarded at all stops 142 and routes 138 in the Nancy network, which data covered a 90-day period, including 13 weekends, 2 weeks of school vacations and three public holidays. Additionally, Fourier transforms were applied to each time series 160 to extract k=16 top elements, as well as the phase space. 2) Meteorological data (i.e., weather data 150), including air temperature (min and max), air humidity, precipitation, wind speed, and the like, which were registered hourly. 3) Calendar data 152, including the aforementioned school vacations, public holidays, and weekends. 4) Traffic information 148 on the network segment relevant to a given task (i.e., the route 138, stop 142, vehicle 144, etc., associated with a particular time series 160 for which demand is desired). The average bus adherence delay accumulated between timestamps i−1 and $i^3$ was used. FIGS. 4A-4B illustrate the demand prediction with the last 20% of data used as the test set, predicted values in green 500 and red 502, true values in blue 504.

Figure 5:
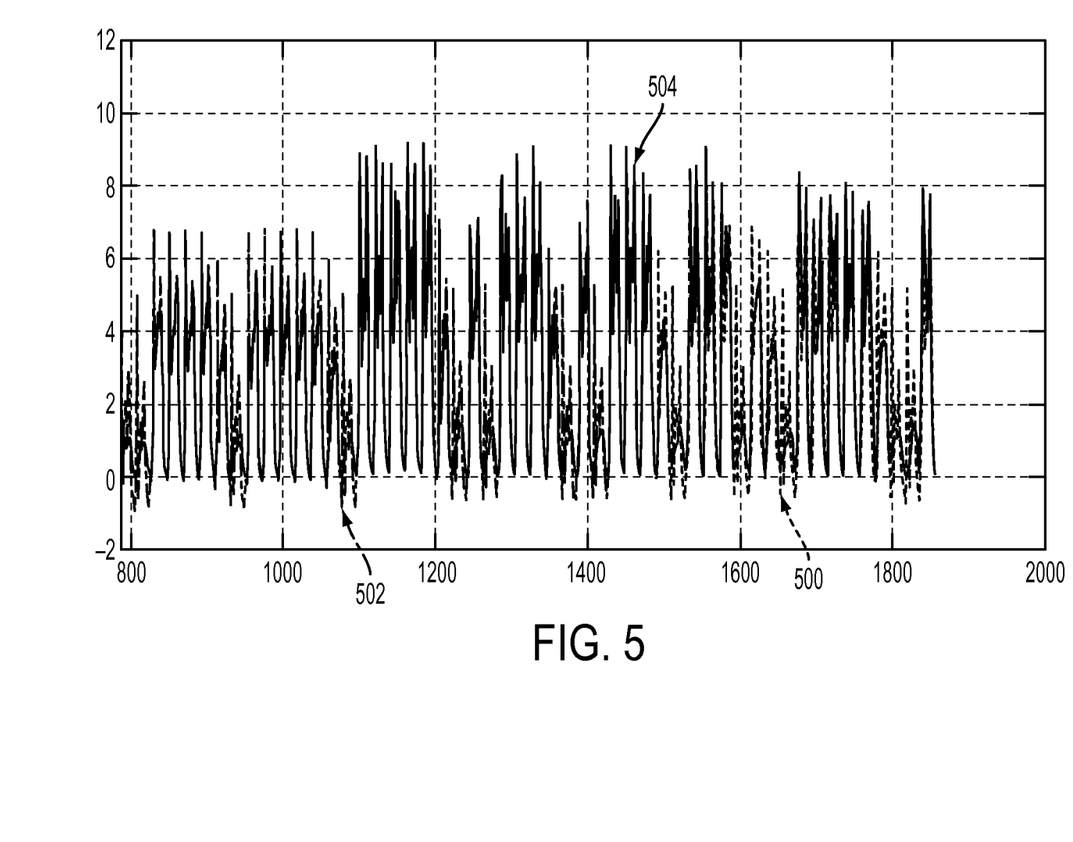
FIG. 5 illustrates demand prediction of an example according to an exemplary embodiment.

All series 160 were split into training and testing sets in the same way. The training set was the starting p % items; the testing set was the remaining 100−p % (see FIG. 5), where p varies from 40% to 90%.

To measure the performance of methods tested, the mean average error (MAE) was used. Two experiments addressed the travel demand 168 prediction on different levels of the transportation network 134: one for routes 138, another for individual stops 142. Out of 36 bus routes in Nancy, a group of four related tasks was identified (e.g., via DTW analysis as discussed above). For the stop experiment, two clusters of two and three related series 160 (corresponding to the stops 142) were identified along two major routes 138 in the city.

Figure 6:
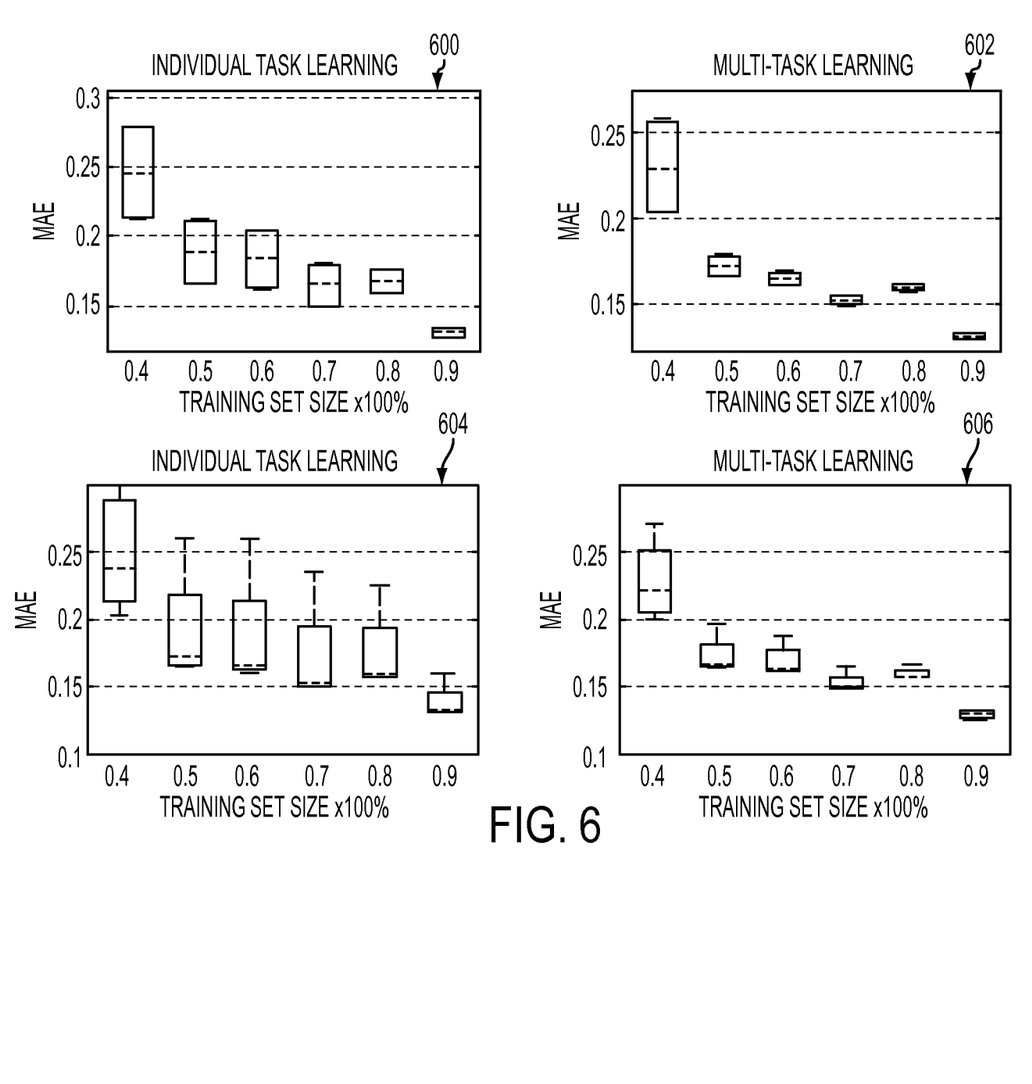
FIG. 6 illustrates a whisker plot of demand prediction on routes and stops according to an exemplary embodiment.
Figure 7:
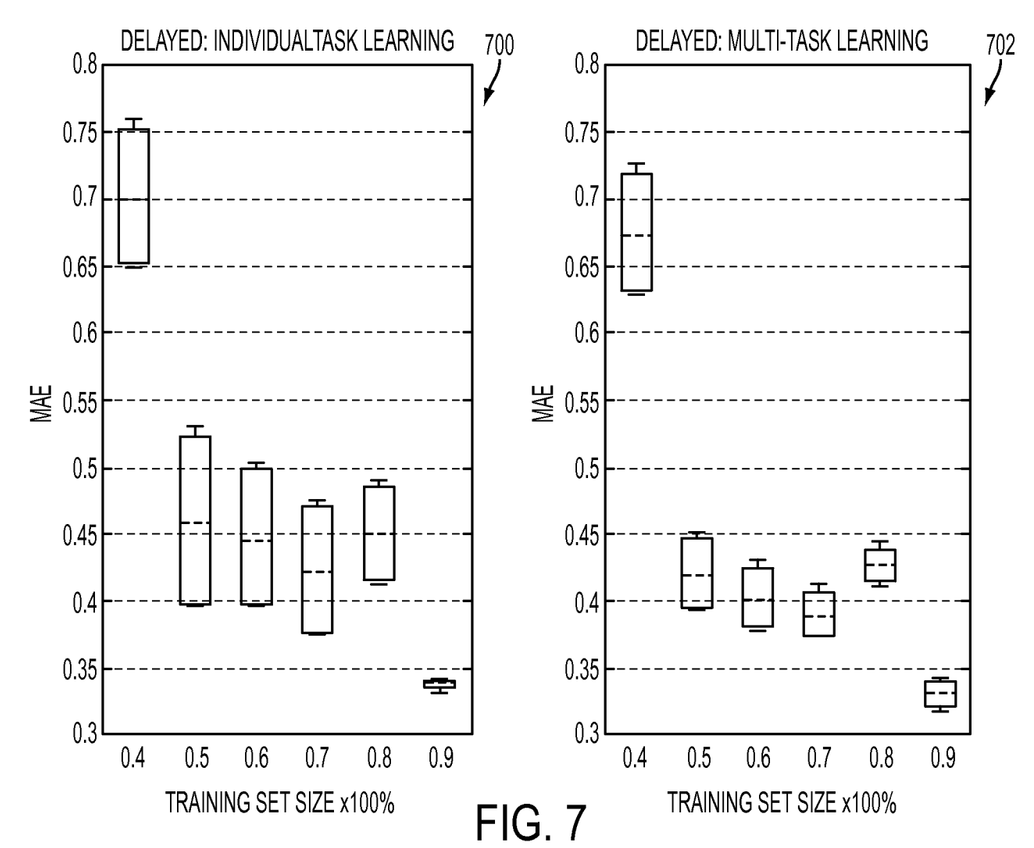
FIG. 7 illustrates a whisker plot of demand prediction on routes and stops with delay according to an exemplary embodiment.

In this preliminary set of experiments, only the linear kernel function $\phi(x)=x$ is used. The depth k=2 for past values was determined by cross-validation. Parameters C and $\epsilon$ were automatically tuned as in the standard SVM regression, the optimal value of parameter $\mu$ was determined via re-sampling method. The whisker plots in FIGS. 6-7 show the mean, variance and outliers for the stop and route experiments. In FIG. 6, the plot 600 illustrates demand prediction for individual learning for the selected route 138 and plot 602 illustrates demand prediction for multi-task learning for the selected route 138. Plot 604 illustrates demand prediction for individual learning for the selected stop 142, and plot 606 illustrated demand prediction for multi-task learning for the selected stop 142. In all series 160 and observations 136, one elementary event refers to one hour values/counts.

Additionally, a prediction scenario was tested with delay with delay where the most recent value $y_{i-1}$ is unavailable and the prediction of $y_i$ uses only $y_{i-2}$, $y_{i-3}$, . . . values. FIG. 6 illustrates the results of individual 700 and multi-task learning 702 for the route case.

The method illustrated in FIGS. 3-4B may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3-4B, can be used to implement the method estimating origins and destinations for users of a transportation system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A multi-task learning method for predicting travel demand on an associated transportation network, comprising:
   collecting observation data corresponding to a plurality of observations of the associated transportation network;
   generating a set of time series corresponding to transportation network data of segments of the associated transportation network;
   forming a plurality of clusters of time series, each time series in the set thereof in one cluster;
   for each cluster, applying multi-task learning to generate a prediction model, including:
      determining a common prediction model for all series in a cluster thereof, and
      determining a specific prediction model for each series in the cluster thereof, wherein the prediction model generated via the multi-task learninq application is a sum of the common prediction model and the specific prediction model for each cluster; and
   predicting travel demand on a selected segment of the associated transportation network corresponding to at least one of the set of time series in accordance with the generated prediction model,
   wherein at least one of the collecting, generating, forming, and predicting is performed by a computer processor.

2. The method according to claim 1, further comprising collecting transportation network data from a plurality of collection components disposed on the associated transportation network.

3. The method according to claim 2, wherein the collected transportation network data includes data representative of current usage of at least one of a route, a vehicle, or a stop of the associated transportation network.

4. The method according to claim 3, wherein generating the set of time series includes generating a time series for each route, vehicle or stop of the associated transportation system corresponding to usage thereof.

5. The method according to claim 4, wherein forming the plurality of clusters further comprises:
   for each pair of time series in the set thereof, measuring a similarity therebetween via at least one selected process; and
   forming the plurality of clusters of time series in accordance with the similarity measurement associated therewith.

6. The method according to claim 5, wherein forming the plurality of clusters further comprises applying a k-means clustering methodology in accordance with the similarity measurements for each pair of time series.

7. The method according to claim 6, wherein the at least one selected process is dynamic time warping.

8. The method according to claim 7, wherein the observation data comprises at least one of historical data, traffic data, weather data, or calendar data.

9. The method according to claim 8, wherein the multi-task learning includes support vector regression.

10. The method according to claim 9, further comprising:
    receiving a selection of the segment of the associated transportation network from an associated user;
    identifying a time series associated with the selected segment; and
    inputting collected observation data into the common prediction model and the specific prediction model associated with the identified time series, wherein the travel demand is predicted for the selected segment in accordance therewith.

11. The method according to claim 10, wherein the segment of the associated transportation network is selected from the group consisting of a route, a vehicle, a stop, a zone, a series of routes, a set of vehicles and a sequence of stops.

12. A computer program product comprising a non-transitory recording medium storing instructions, which when executed on a computer causes the computer to perform the method of claim 1.

13. A system comprising memory storing instructions for performing the method of claim 1, and a processor in communication with the memory which implements the instructions.

14. A multi-task learning system for predicting travel demand on an associated transportation network, comprising:
　a time series generator component configured to generate a set of time series corresponding to segments of the associated transportation network;
　a multi-task learning module configured to generate a prediction model for each of a plurality of clusters of time series, wherein the multi-task learning module determines a common prediction model for all series in a cluster thereof, and determines a specific prediction model for each series in the cluster thereof, and wherein the generated prediction model is a sum of the common prediction model and the specific prediction model for each cluster;
　memory which stores instructions for:
　　collecting, from a plurality of collection components, transportation network data corresponding to the segments of the associated transportation network,
　　receiving observation data corresponding to a plurality of observations associated with the transportation network, and
　　predicting travel demand on a selected segment of the associated transportation network in accordance with the received observation data and the prediction model of the cluster with which the time series corresponding to the selected segment is associated; and
　a processor in communication with the memory which executes the instructions.

15. The system of claim 14, wherein the segments of the associated network correspond to at least one of a route, a stop, or a vehicle.

16. The system of claim 15, further comprising a similarity module configured to measure a similarity measure between each of a pair of time series via dynamic time warping.

17. The system according to claim 15, further comprising a clustering module configured to apply a k-means clustering method to the time series in accordance with the similarity measure of each pair of time series.

18. The system according to claim 17, wherein the observation data comprises at least one of historical data, traffic data, weather data, or calendar data.

19. The system according to claim 18, wherein the prediction models are generated via multi-task learning support vector regression.

20. A computer-implemented multi-task learning method for predicting travel demand on an associated transportation network, comprising:
　collecting data corresponding to the associated transportation network, the data including at least one of observation data and transportation network data;
　generating a set of time series corresponding to segments of the associated transportation network in accordance with at least one of the observation data or the transportation network data;
　measuring a similarity between each pair of the set of time series via dynamic time warping;
　forming a plurality of clusters of time series based upon the measured similarity of each pair of time series;
　for each cluster, applying multi-task learning support vector regression to generate a prediction model, the application comprising:
　　determining a common prediction model for all series in a cluster thereof; and
　　determining a specific prediction model for each series in the cluster thereof, wherein the prediction model generated via the multi-task learning application is a sum of the common prediction model and the specific prediction model for each cluster; and
　predicting travel demand on a selected segment of the associated transportation network corresponding to at least one of the set of time series in accordance with the generated prediction model.

* * * * *